US011217035B2

(12) United States Patent
El Hajjar

(10) Patent No.: US 11,217,035 B2
(45) Date of Patent: Jan. 4, 2022

(54) GENERATING HEIGHT MAPS FROM NORMAL MAPS BASED ON BOUNDARY CONDITIONS OF VIRTUAL BOUNDARIES

(71) Applicant: Adobe Inc., San Jose, CA (US)

(72) Inventor: Jean-Francois El Hajjar, Paris (FR)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/529,618

(22) Filed: Aug. 1, 2019

(65) Prior Publication Data

US 2020/0051340 A1   Feb. 13, 2020

(30) Foreign Application Priority Data

Aug. 10, 2018 (FR) ...................................... 18/70920

(51) Int. Cl.
*G06T 19/20* (2011.01)
(52) U.S. Cl.
CPC ...... *G06T 19/20* (2013.01); *G06T 2219/2021* (2013.01)
(58) Field of Classification Search
None
See application file for complete search history.

(56) References Cited

U.S. PATENT DOCUMENTS

| | | | | |
|---|---|---|---|---|
| 5,923,329 A * | 7/1999 | Beale | ...................... | G06T 17/20 345/418 |
| 6,850,244 B2 * | 2/2005 | Munshi | ..................... | G06F 3/14 345/584 |
| 7,864,177 B2 * | 1/2011 | Bunnell | ................ | G06T 15/506 345/426 |
| 8,786,595 B2 * | 7/2014 | Baker | ..................... | G06T 5/002 345/419 |
| 8,803,887 B2 * | 8/2014 | McAdams | .............. | G06T 13/40 345/473 |
| 2006/0244757 A1 | 11/2006 | Fang et al. | | |
| 2010/0277475 A1 * | 11/2010 | McAdams | .............. | G06T 19/00 345/420 |

(Continued)

OTHER PUBLICATIONS

Cheng, Yue, and Hui-liang Shen. "Shape from gradient fields using kernel Poisson equation." 2012 IEEE International Conference on Computer Science and Automation Engineering (CSAE). vol. 1. IEEE, 2012.*

(Continued)

*Primary Examiner* — Ryan M Gray
(74) *Attorney, Agent, or Firm* — Keller Jolley Preece

(57) ABSTRACT

The present disclosure relates to systems, methods, and non-transitory computer readable media for generating and providing a height map of a three-dimensional digital model based on a normal map of the three-dimensional digital model. For example, the disclosed systems can generate a height map from a normal map by utilizing a Poisson model based on Dirichlet boundary conditions. The disclosed systems can determine the Dirichlet boundary conditions for a virtual boundary of a gradient map corresponding to a given normal map by imposing pure Neumann boundary conditions for the virtual boundary. Based on the Dirichlet boundary conditions, the disclosed systems can utilize a Poisson model to determine height values for pixels of a gradient map corresponding to pixels of a given normal map.

20 Claims, 9 Drawing Sheets

(56) References Cited

U.S. PATENT DOCUMENTS

| | | | | |
|---|---|---|---|---|
| 2012/0263377 A1* | 10/2012 | Finlayson | ............... | G06T 5/001 382/162 |
| 2015/0193974 A1* | 7/2015 | Chen | ............... | G06T 17/20 345/427 |
| 2016/0042530 A1 | 2/2016 | Imber et al. | | |
| 2016/0042556 A1* | 2/2016 | Imber | ............... | G06T 17/00 345/426 |
| 2016/0350979 A1* | 12/2016 | Zeng | ............... | G06T 15/04 |
| 2018/0012407 A1* | 1/2018 | Chuang | ............... | G06T 7/75 |

OTHER PUBLICATIONS

Yamaura, Yusuke, et al. "Shape reconstruction from a normal map in terms of uniform bi-quadratic B-spline surfaces." Computer-Aided Design 63 (2015): 129-140.*

Lebrun, Marc, et al. "Numerical Simulation of Landscape Evolution Models." Image Processing on Line 8 (2018): 219-250.*

Durou, Jean-Denis, Yvain Quéau, and Jean-François Aujol. "Normal Integration—Part I: A Survey." Journal of Mathematical Imaging and Vision (2016).*

Wang, Feng-Yu. "Gradient estimates and the first Neumann eigenvalue on manifolds with boundary." Stochastic processes and their applications 115.9 (2005): 1475-1486.*

Torp, Audun. Sparse linear algebra on a GPU: with Applications to flow in porous Media. MS thesis. Institutt for matematiske fag, 2009.*

Search Report as received in French application FR1870920 dated Mar. 14, 2019.

Written Opinion as received in French application FR1870920 dated Aug. 10, 2018.

Saracchini Rafael F et al.: "Multi-scale Integration of Slope Data on an Irregular Mesh", Nov. 20, 2011 (Nov. 20, 2011), Proc. Int.Conf. Adv. Biometrics (ICB); [Lecture Notes in Computer Science; Lect. Notes Computer], Springer, Berlin, Heidelberg, pp. 109-120, XP047469892, ISBN: 978-3-642-17318-9.

Agrawal Amit et al.: "What Is the Range of Surface Reconstructions from a Gradient Field?", May 7, 2006 (May 7, 2006), Proc. Int.Conf. Adv. Biometrics (ICB); [Lecture Notes in Computer Science; Lect.Notes Computer], Springer, Berlin, Heidelberg, pp. 578-591, XP047429693, ISBN: 978-3-642-17318-9.

Yuanyuan Ding et al.: "Dynamic fluid surface acquisition using a camera array", Computer Msion (ICCV), 2011 IEEE International Conference On, IEEE, Nov. 6, 2011 (Nov. 6, 2011), pp. 2478-2485, XP032093922, OIi: 10.1109/ICCV.2011.6126533, ISBN: 978-1-4577-1101-5.

Zhang Yu-Wei et al.: "Modeling Chinese calligraphy reliefs from one image", Computers and Graphics, Elsevier, GB, vol. 70, Jul. 21, 2017 (Jul. 21, 2017), pp. 300-306, XP085332628, ISSN 0097-8493, DOI: 10.1016/J.CAG.2017.07.022.

* cited by examiner

GENERATING HEIGHT MAPS FROM NORMAL MAPS BASED ON BOUNDARY CONDITIONS OF VIRTUAL BOUNDARIES

CROSS REFERENCE TO RELATED APPLICATIONS

This application claims the benefit of, and priority to, French patent application number FR 18/70920 filed on Aug. 10, 2018. The entire contents of the foregoing patent application are hereby incorporated by reference.

BACKGROUND

Advancements in software and hardware platforms have led to a variety of improvements in digital mapping systems that generate, manipulate, and/or render three-dimensional digital models. For example, digital mapping systems are now able to generate three-dimensional digital models made up of tessellations, identify normal maps or height maps corresponding to these three-dimensional models, and simulate interactions between light and matter based on the normal maps and/or height maps. Indeed, digital mapping systems can utilize a normal map to augment a mesh in terms of microscopic geometric details (e.g., high frequencies) and/or can utilize a height map to augment macroscopic geometric details.

Although height maps and normal maps both encode geometric information regarding a digital model, they are not equivalent. Indeed, because normal maps reflect a slope or direction while height maps reflect position or displacement relative to a base surface (e.g., a local tangent space of a supporting mesh), a height map will theoretically have only a single matching normal map, whereas a single normal map can have multiple matching height maps. In other words, height maps are usually not deterministic relative to normal maps. Moreover, in many circumstances, height maps are preferable to normal maps in generating or rendering three-dimensional models. For example, normal maps are more difficult to manipulate for designers (e.g., designers cannot easily modify or mold normal maps to achieve desired changes to a three-dimensional model due to a lack of dedicated editing tools and the non-intuitive nature of the process). Moreover, normal maps tend to be less accurate in low frequency details in geometry and provide less realistic three-dimensional rendering (e.g., normal mapping rather than displacement mapping) due in part to the fact that editors often use normal maps for modifying the shading of a surface rather than its geometry.

Nonetheless, in many circumstances conventional digital mapping systems can only access normal maps corresponding to a three-dimensional model. For example, many scanning operations for three-dimensional models generate only normal maps (not height maps). In addition, many materials in three-dimensional models are defined based on normal maps (e.g., normal geometry) due to its popularity and computational cost. In such circumstances, where normal maps (and not accurate height maps) are available, conventional digital mapping systems cannot generate accurate height maps. Indeed, because height maps are usually non-deterministic relative to a given normal map, conventional digital mapping systems cannot accurately generate a height map reflecting a three-dimensional model utilizing a given normal map.

Conventional systems that do seek to generate height maps from normal maps have a number of problems in relation to accuracy, efficiency, and flexibility of operation. For example, conventional digital mapping systems can utilize high-overhead computing models to attempt to solve for a height map based on a normal map. These approaches, however, often leave inaccuracies and artifacts in resulting height maps. To illustrate, some families of conventional digital mapping systems generate height maps with various artifacts, such as oscillations or waves. These inaccuracies in height maps lead to corresponding inaccuracies in digital models or materials rendered utilizing the height maps.

Further, conventional digital mapping systems are inefficient. As just mentioned, some conventional systems utilize complex computing models that require significant time and computer resources to generate a potential solution. For instance, a texture of 4096 by 4096 elements is considered standard within a video game today, which translates to a total of 16,777,216 heights to determine for that texture. Conventional systems require excessive computing resources to generate such height maps and are too slow for interactive determinations of such large numbers of heights.

In addition, conventional digital mapping systems are inefficient and inflexible in providing operating tools for manipulating three-dimensional models. Indeed, because conventional digital mapping systems cannot provide height maps from normal maps, they often rigidly require interaction directly with normal maps, which is inefficient and counter-intuitive. Indeed, it is generally more efficient for users to modify the shape (or height) of three-dimensional models. In contrast, conventional systems often require significant time and user interactions to make modifications to three-dimensional representations by modifying the normal map (e.g., slope).

Thus, there are several disadvantages with conventional digital mapping systems.

SUMMARY

One or more embodiments described herein provide benefits and solve one or more of the foregoing or other problems in the art with systems, methods, and non-transitory computer readable media that generate and provide height maps from normal maps based on boundary conditions of virtual boundaries. In particular, the disclosed systems can generate a height map that represents accurate geometric properties and material parameters of a three-dimensional digital model based on a normal map. For example, in some embodiments the disclosed systems generate a height map from a normal map by imposing Neumann boundary conditions (e.g., imposing a value to the derivative of the height along the boundary of the integration domain) to determine height values for a virtual boundary. The disclosed systems can then utilize the determined height values for the virtual boundary as Dirichlet boundary conditions (e.g., imposing a value to the height itself along the boundary) to determine a height map for the entire grid. In this manner, the disclosed systems can efficiently generate an accurate height map from a normal map. Moreover, the disclosed systems can further determine accurate material parameters and/or generate accurate renderings of three-dimensional digital models based on height maps.

To illustrate, in one or more embodiments, the disclosed systems can resolve a two-dimensional Poisson system for an entire grid based on Dirichlet boundary conditions. To obtain the Dirichlet boundary conditions, the disclosed systems can utilize a one-dimensional Poisson system with periodic boundary conditions (e.g., a closed curve that describes the virtual boundary). For instance, the disclosed systems can implement a pre-process of solving a one-dimensional Poisson system where the right-hand side of the system of linear equations is set while conceptually considering an extrapolated gradient field that arises based on pure Neumann boundary conditions. Thus, the disclosed systems can solve the one-dimensional Poisson system by imposing pure Neumann boundary conditions to determine height values for a virtual boundary, and utilize the height values as Dirichlet boundary conditions for solving a two-dimensional Poisson system. In this manner, the disclosed system can generate a height map by determining height values for the entire grid within the virtual boundary.

Additional features and advantages of the present application will be set forth in the following description or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
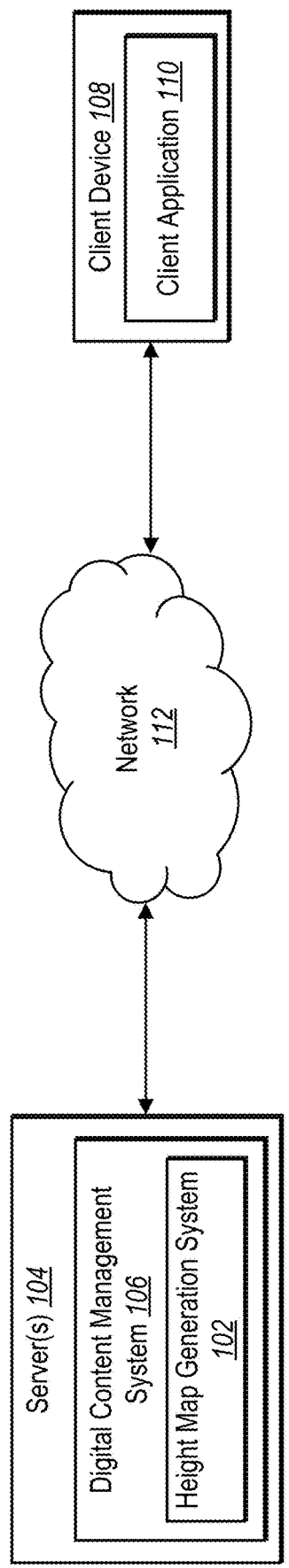
FIG. 1 illustrates an example environment for implementing a height map generation system in accordance with one or more embodiments.

One or more embodiments described herein provide benefits and solve one or more of the foregoing or other problems in the art with a height map generation system that accurately and efficiently generates a height map of a three-dimensional digital model from a normal map of the three-dimensional digital model based on boundary conditions of a virtual boundary. To generate a height map from a normal map, the height map generation system can utilize a pre-processing technique to determine a virtual boundary and then determine a height map from the normal map utilizing the virtual boundary. In particular, the height map generation system can impose slope boundary conditions along a virtual boundary (e.g., pure Neumann boundary conditions), determine height values along the virtual boundary (e.g., Dirichlet boundary conditions), and then utilize the height values along the virtual boundary to generate a height map.

To illustrate, the height map generation system can generate a gradient map from the normal map of a three-dimensional digital model. Based on the gradient map, the height map generation system can impose Neumann boundary conditions on the virtual boundary (e.g., impose a constant change in height relative to changes in gradient along the virtual boundary). By imposing the Neumann boundary condition, the height map generation system can utilize a Poisson model to determine Dirichlet boundary conditions (e.g., height values along the virtual boundary). With Dirichlet boundary conditions along the virtual boundary, the height map generation system can solve a Poisson system to generate the remaining height map for the three-dimensional model. Thus, even though generating a height map from a normal map is generally non-deterministic, the height map generation system can efficiently generate an accurate height map (e.g., without artifacts or oscillations).

As mentioned, the height map generation system can generate a height map from a normal map. To generate the height map, the height map generation system can utilize a Poisson model to solve a system of linear equations based on a gradient field of a virtual boundary. To solve such a Poisson system, the height map generation system determines Dirichlet boundary conditions to the virtual boundary. However, Dirichlet boundary conditions are not readily available or known (e.g., known to an artist or user). Thus, as mentioned above, the height map generation system can determine Dirichlet boundary conditions for the virtual boundary by imposing Neumann boundary conditions.

The height map generation system can impose these conditions by initially generating a gradient map from a normal map of a three-dimensional digital model. To elaborate, the height map generation system can determine gradients of a three-dimensional digital model at different coordinate locations based on normals of the three-dimensional digital model at the coordinate locations. For example, in some embodiments, the height map generation system generates a two-dimensional gradient map of a three-dimensional digital model based on determining directions of normal vectors of a three-dimensional digital model.

Additionally, the height map generation system can generate a virtual boundary for a normal map of a three-dimensional digital model. In particular, the height map generation system can determine a rectangular virtual boundary (or some other shape) having particular dimensions (e.g., a length and/or a width and/or a thickness) that encompasses, or defines the boundaries of, at least a portion of a normal map of a three-dimensional digital model. In these or other embodiments, the height map generation system can impose particular boundary conditions on the virtual boundary for generating a gradient field for the virtual boundary.

For example, the height map generation system can apply pure Neumann boundary conditions (e.g., set the derivative of height relative to the virtual boundary's outward normal direction to zero) to the virtual boundary to model a gradient field of the virtual boundary from the gradient map. Indeed, the height map generation system can model a gradient field for a virtual boundary that includes a lower section, two side sections (e.g., a right side section and a left side section), and an upper section. Additionally, the height map generation system can determine horizontal gradients and vertical gradients from the gradient map (e.g., a horizontal component of a gradient map and a vertical component of the gradient map) and can generate the gradient field to represent a closed curve virtual boundary of the three-dimensional digital model.

Further, the height map generation system can determine Dirichlet boundary conditions based on these pure Neumann boundary conditions. In particular, based on imposing pure Neumann boundary conditions to require that the derivative of height with respect to changes in normal vectors is fixed (e.g., 0), the height map generation system can solve a Poisson system and determine Dirichlet boundary conditions that indicate fixed values for heights along the virtual boundary.

As mentioned, the height map generation system can utilize a Poisson model to determine heights of a three-dimensional digital model based on the gradient field of the virtual boundary and the Dirichlet boundary conditions. For instance, the height map generation system can utilize a Poisson model to solve a system of linear equations that is based on discretized gradient values of the virtual boundary and height values of the virtual boundary. By utilizing the Poisson model to solve the system of linear equations, the height map generation system can determine heights and generate a height map of a three-dimensional digital model represented by the normal map.

Based on the height map, the height map generation system can perform further functions as well. For example, the height map generation system can determine a texture of geometry associated with a material that makes up a three-dimensional digital model. In addition (or alternatively), the height map generation system can generate a three-dimensional rendering of a three-dimensional digital model represented by a height map and/or a normal map.

The height map generation system provides several advantages over conventional digital mapping systems. For example, the height map generation system improves accuracy relative to conventional systems. By determining and utilizing a Poisson model based on Dirichlet boundary conditions after imposing Neumann boundary conditions, the height map generation system generates accurate height maps. Indeed, the height map generation system can determine height maps without artifacts or oscillations. Moreover, as a result of generating accurate height maps, the height map generation system further generates accurate material parameters and/or three-dimensional representations. Indeed, the height map generation system can more accurately simulate interactions between light and matter in rendering three-dimensional representations by utilizing displacement mapping techniques (rather than normal mapping).

Additionally, the height map generation system improves efficiency over conventional digital mapping systems. In particular, while some conventional systems rely on computationally expensive simulations or optimizations, the height map generation system efficiently generates a height map from a normal map by generating gradient fields and implementing a relatively low-overhead Poisson system (e.g., by utilizing available dedicated libraries such as the Poisson solver from INTEL MKL). Thus, the height map generation system utilizes less computing time and computing power. Indeed, the height map generation system can operate interactively and generate height maps from normal map near instantaneously.

In addition, the height map generation system provides more intuitive, efficient user interfaces and more flexible operation than conventional systems. Indeed, the height map generation system can provide tools for modifying a height map directly (even when no height map is initially available for a three-dimensional model). Thus, utilizing the height map generation system, designers can modify a height map via a user interface to efficiently and quickly make modifications to a corresponding three-dimensional representation.

As illustrated by the foregoing discussion, the present disclosure utilizes a variety of terms to describe features and benefits of the height map generation system. Additional detail is hereafter provided regarding the meaning of these terms as used in this disclosure. In particular, the term "normal map" refers to a representation of normal vectors (or "normals") projecting from a digital object. For example, a normal map can include an array, database, matrix, digital image, or other digital item reflecting normal vectors projecting from surfaces of the three-dimensional digital model (e.g., vectors reflecting orientation of the surfaces). In some embodiments, a normal map illustrates different directions of normal vectors with different colors and/or shading for corresponding pixels (e.g., when packing and quantizing vector values in integral format).

Relatedly, the term "height map" refers to a representation of heights (e.g., elevations, positions, or displacements) of a digital object. For example, a height map can include an array, database, matrix, digital image, or other digital item reflecting heights or elevations at locations of a three-dimensional digital model. In some embodiments, a height map includes a digital image where different heights are represented by different colors and/or shading for respective pixels.

As mentioned, the height map generation system can generate a gradient map (e.g., a two-dimensional gradient map which locally defines the slopes of the height values) from a normal map. As used herein, the term "gradient map" refers to a representation of gradients of a digital object. For example, a gradient map can include an array, database, matrix, digital image, or other digital item reflecting gradients or slopes at different locations of a three-dimensional model. In some embodiments, a gradient map can include a digital image where pixel values (e.g., color or brightness) represent gradients or slopes of height values at different locations of a three-dimensional model.

As mentioned, the height map generation system can generate boundary conditions for a virtual boundary in relation to a three-dimensional digital model. As used herein, the term "virtual boundary" refers to a boundary that encompasses or bounds all, or at least a portion of, a normal map. A virtual boundary can include a virtual representation of pixels, data points, or locations arranged in variety of shapes (e.g., a circle, square, or other polygon). For example, the virtual boundary can include a boundary that is rectangular in shape and that has a width, a length, and a thickness. In some embodiments, a virtual boundary can include segments that make up the virtual boundary such as a right side segment, a left side segment, a bottom segment, and a top segment. In some embodiments, the virtual boundary is a closed curve that starts and ends at the same position or location.

Relatedly, the term "boundary condition" refers to a constraint or baseline (e.g., values) imposed at a boundary. For example, a boundary condition can include a condition imposed on a boundary for evaluating differential equations to determine heights of pixels of a normal map such as a Neumann boundary condition and/or a Dirichlet boundary condition. A "Neumann boundary condition" refers to a boundary condition that specifies a slope condition (e.g., a normal derivative value of a function). For example, a Neumann condition can include a boundary condition that specifies the normal derivative of a height function. Along these lines, a pure Neumann boundary condition refers to a boundary condition that specifies that the normal derivative of a height function is zero—or that height remains unchanged with respect to changes in normal vectors. A "Dirichlet boundary condition" refers to a boundary condition that specifies the value of a function itself. For example, a Dirichlet boundary condition can include a boundary condition that specifies height values for a height function at particular locations or pixels. In some embodiments, a Dirichlet boundary condition includes a height value at a pixel location of a virtual boundary.

As mentioned, the height map generation system can utilize a Poisson model to determine heights of pixels. As used herein, the term "Poisson model" refers to one or more algorithms for generating and/or evaluating a Poisson system or a system of linear Poisson equations. For example, the Poisson model can generate a system of Poisson equations based on a gradient field of a virtual boundary and one or more height values (obtained via Dirichlet conditions) for the virtual boundary. In some embodiments, the Poisson model can evaluate or solve the system of linear equations to determine heights for pixels (or other discretized portions of a gradient map) to further generate a height map.

As also mentioned, the height map generation system can determine material parameters based on a height map. As used herein, the term "material parameter" refers to a parameter, property, or attribute of a material of a three-dimensional digital model. For example, a material parameter can include a value of an albedo, a type of material (e.g., metal), a texture of material, a roughness value, a normal value, an ambient occlusion value, a luminosity value, a color value, a refractive index value, a reflectivity value, and/or an absorbance value. As mentioned, the height map generation system can determine one or more materials or material parameters based on a height map.

Additional detail regarding the height map generation system will now be provided with reference to the figures. For example, FIG. 1 illustrates a schematic diagram of an example computing system environment for implementing a height map generation system 102 in accordance with one or more embodiments. An overview of the height map generation system 102 is described in relation to FIG. 1. Thereafter, a more detailed description of the components and processes of the height map generation system 102 is provided in relation to the subsequent figures.

As shown in FIG. 1, the environment includes server(s) 104, a client device 108, and a network 112. Each of the components of the environment can communicate via the network 112, and the network 112 may be any suitable network over which computing devices can communicate. Example networks are discussed in more detail below in relation to FIG. 9.

As mentioned, the environment includes a client device 108. In particular, the client device 108 can be one of a variety of computing devices, including a smartphone, a tablet, a smart a television, a desktop computer, a laptop computer, a virtual reality device, an augmented reality device, or another computing device as described in relation to FIG. 9. The client device 108 can provide or display one or more user interfaces for generating or manipulating three-dimensional digital models with the client application 110. The client device 108 can receive user input from an artist user in the form of clicks, keyboard inputs, touchscreen inputs, etc. to perform various functions within, or apart from, the client application 108. In some embodiments, the client device 108 facilitates generation of height maps from normal maps (e.g., based on user input to select an option to generate a height map). The client device 108 can also receive user inputs from an artist user to modify a height map.

As shown, the client device 108 includes a client application 110 whereby an artist can generate a height map from a normal map of a three-dimensional digital model. The client application 110 may be a web application, a native application installed on the client device 108 (e.g., a mobile application, a desktop application, etc.), or a cloud-based application where all or part of the functionality is performed by the server(s) 104. The client application 110 can present or display information to an artist such as a normal map and editing tools for modifying various parameters associated with three-dimensional digital models (e.g., modifying a height map). The client application 110 can also include a selectable option to generate a height map from a normal map. Thus, the client application 110 can also present a height map of a three-dimensional digital model as well as indications of material parameters for the three-dimensional digital model.

As illustrated in FIG. 1, the environment includes the server(s) 104. The server(s) 104 may generate, store, process, receive, and transmit electronic data, such as normal maps, gradient maps, and height maps of three-dimensional digital models. For example, the server(s) 104 can transmit data to the client device 108 to provide a user interface including a normal map for display via the client application 110. The server(s) 104 may identify (e.g., monitor and/or receive) data from the client device 110 in the form of an input to generate a height map from a normal map. In some embodiments, the server(s) 104 comprises a digital content server. The server(s) 104 can also (or alternatively) comprise an application server, a communication server, a web-hosting server, a social networking server, a digital content campaign server, or a digital communication management server.

As shown in FIG. 1, the server(s) 104 can also include the height map generation system 102 (e.g., implemented as part of a digital content management system 106). Although FIG. 1 depicts the height map generation system 102 located on the server(s) 104, in some embodiments, the height map generation system 102 may be implemented by (e.g., located entirely or in part) on one or more other components of the environment. For example, the height map generation system 102 may be implemented by the learner device 108, and/or a third-party device.

In some embodiments, though not illustrated in FIG. 1, the environment may have a different arrangement of components and/or may have a different number or set of components altogether. For example, environment can include a database for storing information such as normal maps, gradient maps, height maps, and/or material parameters associated with a three-dimensional digital model. The database can be housed by the server(s) 104, the client device 108, and/or separately by a third party in communication via the network 112. In addition, the client device 108 may communicate directly with the height map generation system 102, bypassing the network 112.

Figure 2:
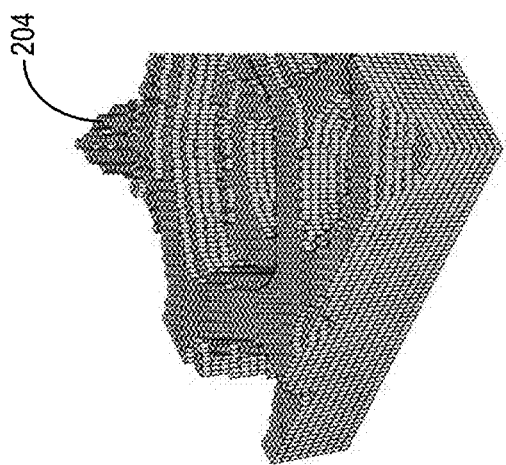
FIG. 2 illustrates an example overview of generating a height map from a normal map in accordance with one or more embodiments.
Figure 2:
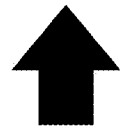
Figure 2:
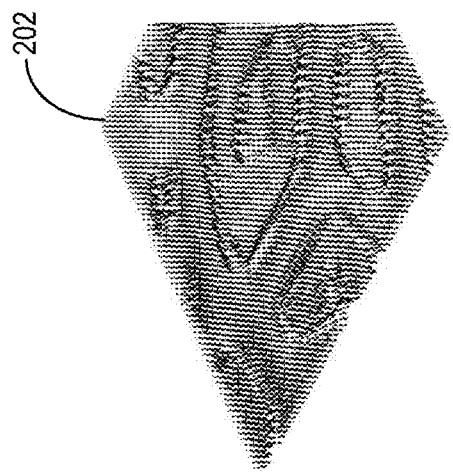

As mentioned, the height map generation system 102 can generate a height map from a normal map. FIG. 2 illustrates an example height map 204 that the height map generation system 102 generates from an example normal map 202 in accordance with one or more embodiments. The description of FIG. 2 provides an overview of generating a height map 204 from a normal map 202 in accordance with one or more embodiments. Thereafter, the description of the subsequent figures provides additional detail regarding various methods involved in generating a height map (e.g., the height map 204) from a normal map (e.g., the normal map 202).

As shown in FIG. 2, the normal map 202 reflects normals for surfaces of a three-dimensional digital model. More specifically, the normal map 202 represents directions of normal vectors projecting from surfaces of a three-dimensional digital model. Thus, the normal map 202 represents the shape of the three-dimensional digital model utilizing colors and/or shading based on directions of normal vectors. However, the normal map 202 is non-intuitive for most artists to understand the shape of the three-dimensional digital model and perform edits or modifications using an application (e.g., the client application 110).

For a more intuitive representation of the shape of the three-dimensional digital model, the height map generation system can generate the height map 204 from the normal map 202. In particular, the height map 204 reflects heights of the same three-dimensional digital model represented by the normal map 202. Indeed, the height map generation system 102 generates the height map 204 that illustrates how different pixels (or other discretized portions of the height map 204) vary in elevation. From an artist's perspective, utilizing the height map 204 to modify a three-dimensional digital model is much more intuitive than utilizing the normal map 202 within an editing interface (e.g., of the client application 110) because the shape of the three-dimensional digital model is more easily discernable.

Figure 3:
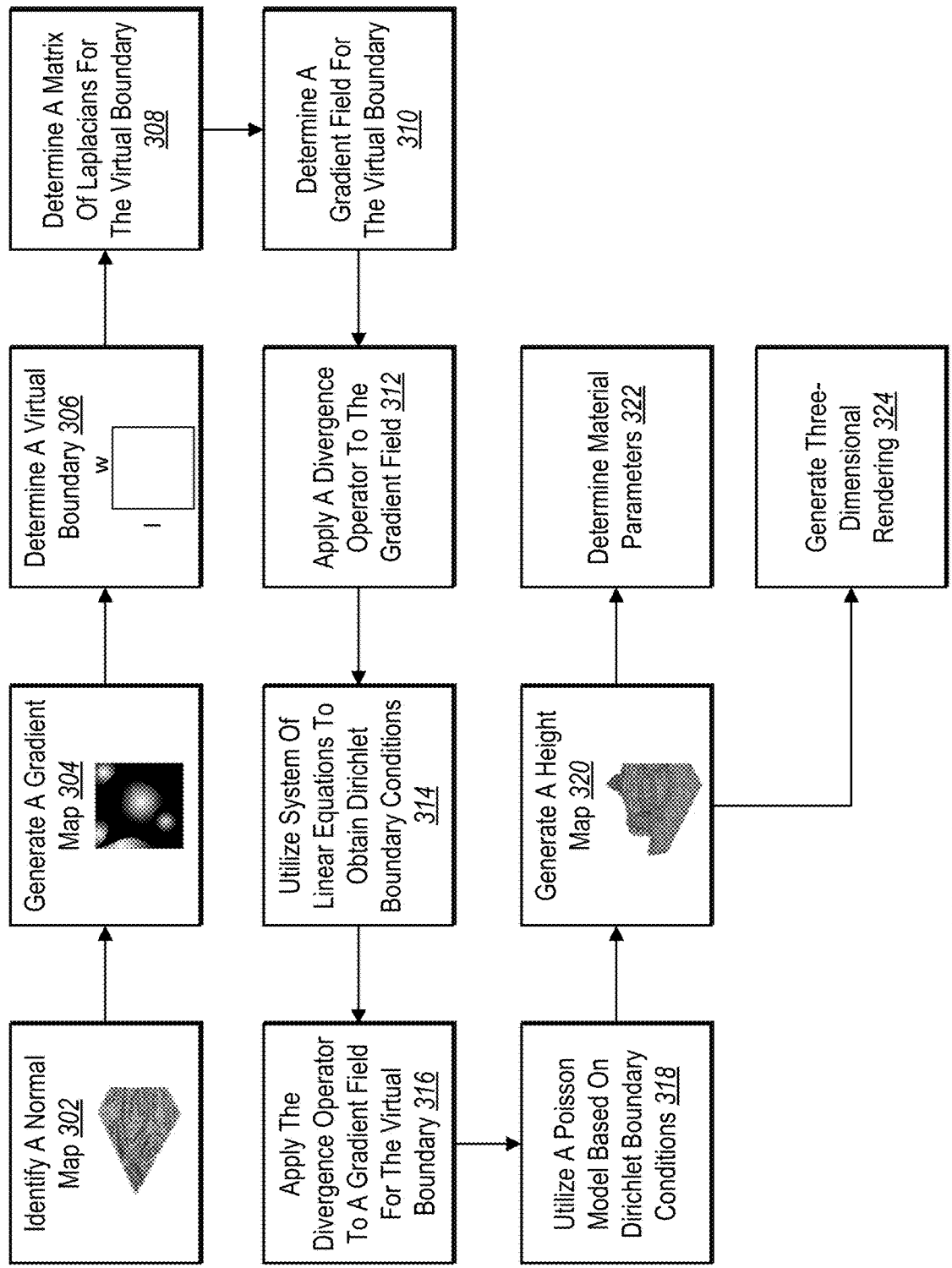
FIG. 3 illustrates an example series of acts for generating a height map based on a normal map in accordance with one or more embodiments.

As mentioned, the height map generation system 102 can utilize a number of methods or techniques to generate the height map 204 from the normal map 202. FIG. 3 illustrates an example series of acts 302-324 that the height map generation system 102 performs to generate and/or utilize the height map 204 in accordance with one or more embodiments. Particularly, the height map generation system 102 can generate the height map 204 and utilize the height map 204 to determine material parameters and/or generate a three-dimensional rendering of a three-dimensional digital model.

As illustrated in FIG. 3, the height map generation system 102 performs an act 302 to identify a normal map. In particular, the height map generation system 102 identifies the normal map 202 that reflects normal vectors of a three-dimensional digital model. In some embodiments, the height map generation system 102 receives the normal map 202 from another device such as the client device 108 or a third-party system. In some embodiments, the height map generation system 102 can generate the normal map (e.g., utilizing a photometric stereo algorithm that generates surface normal by observing objects under different lighting conditions). The height map generation system 102 can also access the normal map 202 from a database.

As also illustrated in FIG. 3, the height map generation system 102 performs an act 304 to generate a gradient map based on the normal map 202. For instance, the height map generation system 102 generates a two-dimensional gradient map from the three-dimensional normal map 202. In these or other embodiments, the height map generation system 102 generates a gradient map in the form of:

$$\begin{pmatrix} p \\ q \end{pmatrix}$$

from a normal map (e.g., the normal map 202) having the form:

$$\begin{pmatrix} n_x \\ n_y \\ n_z \end{pmatrix}$$

where:

$$p = -\frac{n_x}{n_z} \text{ and } q = -\frac{n_y}{n_z}.$$

As shown, the height map generation system 102 further performs an act 306 to determine a virtual boundary. In particular, to make the normal map 202 integrable, the height map generation system 102 imposes boundary conditions for the normal map 202 by generating a virtual boundary to define the boundary conditions on variables at the edges of the integration area. In some embodiments, the height map generation system 102 generates a virtual boundary that is rectangular in shape with a width (e.g., w pixels wide) and a length (e.g., l pixels long). In these or other embodiments, the height map generation system 102 generates a virtual boundary having a particular thickness (e.g., one pixel, two pixels, etc.). For instance, the height map generation system 102 generates a virtual boundary having dimensions of w (width)×l(length)×1 (thickness) pixels for a total number of pixels within the virtual boundary of 2w+2l+4. In some embodiments, the height map generation system 102 generates the virtual boundary to include multiple segments such as a left side segment, a right side segment, a bottom segment, and a top segment.

As also shown, the height map generation system 102 performs an act 308 to determine a matrix of Laplacians (or Laplace operators) for the virtual boundary. More specifically, the height map generation system 102 determines a matrix of one-dimensional Laplacians for the virtual boundary. In some embodiments, the height map generation system 102 determines Laplacians (e.g., sparse matrices on the left-hand side of the Poisson system, Ax=b, having their definitions decorrelated from the right-hand side). Thus, in these or other embodiments, the height map generation system 102 generates the matrix of Laplacians to represent the virtual boundary.

The height map generation system 102 further performs an act 310 to determine a gradient field for the virtual boundary. In particular, the height map generation system 102 generates a one-dimensional gradient field for the virtual boundary from the two-dimensional gradient field. In some embodiments, the height map generation system 102 generates the one-dimensional gradient field to represent the virtual boundary based on the matrix of Laplacians that represents the virtual boundary. Indeed, the height map generation system 102 generates a one-dimensional gradient field that includes gradients that define the virtual boundary (e.g., horizontal gradients or virtual gradients) as a one-dimensional closed curve.

As shown, the height map generation system 102 further performs an act 312 to apply a divergence operator to the gradient field of the virtual boundary. As a basis for applying a divergence operator, to determine heights for pixels (or other portions) of the normal map 202, the height map generation system 102 generates a height map (e.g., the height map 204) that minimizes deviation error in a least square sense. For example, the height map generation system 102 determines a height field given by:

$$J(z(x,y)) = \iint ((z_x-p)^2 + (z_y-q)^2) dx dy$$

where z is a height value (e.g., a z-axis value), x is a horizontal value (e.g., an x-axis value), and y is a vertical value (e.g., a y-axis value).

Based on this formulation for generating a height map (e.g., the height map 204), the height map generation system 102 further generates a Euler-Lagrange equation to determine Laplacians of heights based on the divergence of a gradient field. For example, the height map generation system 102 determines a Laplacian of the height based on a divergence of the gradient field, as given by:

$$\nabla^2 z = \nabla \cdot \begin{pmatrix} p \\ q \end{pmatrix}$$

where $\nabla$ and $\nabla^2$ represent respective differential operators of a two-dimensional gradient, and where:

$$\nabla^T = \left(\frac{\partial}{\partial x}, \frac{\partial}{\partial y}\right) \text{ and the Laplacian } \nabla^2 = \frac{\partial^2}{\partial x^2} + \frac{\partial^2}{\partial y^2}.$$

Because the gradient field is known from the normal map 202, the right-hand term of the Euler-Lagrange equation is determinable as a constant vector with a size equal to the number of pixels (or other portions) whose heights are to be determined for generating the height map 204. Thus, the height map generation system 102 solves a second order partial differential equation known as a Poisson equation to determine the heights.

In addition, the height map generation system 102 applies the divergence operator (e.g., a one-dimensional divergence operator) to the one-dimensional gradient field of the virtual boundary with respect to these conditions utilizing pure Neumann boundary conditions. By supplementing the pure Neumann boundary conditions, the height map generation system 102 determines a range of heights of the resolution z(x, y). For example, the height map generation system 102 determines a range of heights by utilizing a linear system given by:

$$\begin{cases} \nabla^2 z = \nabla \cdot \begin{pmatrix} p \\ q \end{pmatrix} & \text{in the domain of } \Omega \\ \frac{\partial z}{\partial \vec{n}} = 0 & \text{in the domain of } \partial \Omega \end{cases}$$

where $\Omega$ is the rectangular domain and $\partial \Omega$ is the domain of the virtual boundary (just outside the rectangular domain). Thus, the Laplacian of the height is equal to the divergence of the gradient field (as represented by $$\nabla^2 z = \nabla \cdot \begin{pmatrix} p \\ q \end{pmatrix}, \text{ and } \frac{\partial z}{\partial \vec{n}} = 0$$

represents the pure Neumann boundary conditions.

As further illustrated in FIG. 3, the height map generation system 102 performs an act 314 to utilize a system of linear equations (e.g., the above symmetric positive definite system of linear equations) to obtain Dirichlet boundary conditions for the virtual boundary from the Neumann boundary conditions. Indeed, to determine heights for the height map 204, the height map generation system 102 utilizes Dirichlet boundary conditions for the virtual boundary. To determine the Dirichlet boundary conditions, the height map generation system 102 imposes Neumann boundary conditions and solves a system of linear equations to determine heights (or changes in heights) for the virtual boundary based on the Neumann boundary conditions. Additional detail regarding determining Dirichlet boundary conditions based on Neumann boundary conditions for determining heights is provided below with reference to FIG. 4. In addition to determining the Dirichlet boundary conditions, the height map generation system 102 further utilizes the system of linear equations to generate a two-dimensional gradient field for the virtual boundary.

Additionally, the height map generation system 102 performs an act 316 to apply a divergence operator to the two-dimensional gradient field for the virtual boundary. Indeed, as mentioned above, the height map generation system 102 generates a two-dimensional gradient field for the virtual boundary. Thus, the height map generation system 102 applies a two-dimensional divergence operator to determine heights corresponding to pixels of the gradient map based on Dirichlet boundary conditions, as given by:

$$\begin{cases} \nabla^2 z = \nabla \cdot \begin{pmatrix} p \\ q \end{pmatrix} & \text{in the domain of } \Omega \\ z = const & \text{in the domain of } \partial \Omega \end{cases}$$

As further illustrated in FIG. 3, the height map generation system 102 performs an act 318 to utilize a Poisson model to determine heights based on Dirichlet boundary conditions. In particular, the height map generation system 102 utilizes a Poisson model to evaluate a system of Poisson equations with the above-mentioned right-hand term of the Euler-Lagrange equation and the Dirichlet boundary conditions equal. By evaluating the Poisson equations with the Poisson model, the height map generation system 102 determines heights for pixels of the gradient map and/or the normal map 202.

For instance, the height map generation system 102 utilizes Poisson model to solve a one-dimensional Poisson system while imposing Dirichlet boundary conditions on the virtual boundary. Considering the Dirichlet boundary conditions to enforce a constant value of zero at the virtual boundary and also considering the virtual boundary to be a one-dimensional closed curve set according to:

$$t \text{ where } t \in [0,1]$$

where t is a normalized parameterization of the virtual boundary, then the height map generation system 102 utilizes a Poisson model to solve a Poisson system to determine heights of the virtual boundary. For example, the height map generation system 102 evaluates a one-dimensional Poisson system given by:

$$\begin{cases} \nabla^2 Z(t) = \nabla \cdot \begin{pmatrix} p \\ q \end{pmatrix} & t \in ]0, 1[ \\ Z(t) = 0 & t = 0 \text{ and } t = 1 \end{cases}$$

Thus, the height map generation system 102 determines height values for the virtual boundary. Additional detail regarding utilizing the Poisson model to determine heights is provided below with reference to FIG. 4.

Based on the determined heights, the height map generation system 102 further performs an act 320 to generate a height map (e.g., the height map 204). Indeed, upon determining the height values for the pixels of the gradient map, the height map generation system 102 generates the height map 204 in the form of a three-dimensional visual representation of the heights of the pixels. Thus, the height map generation system 102 can generate a height map 204 from a normal map 202.

As shown, the height map generation system 102 also performs an act 322 to determine material parameters. More specifically, the height map generation system 102 determines material parameters for the composition of the three-dimensional digital model represented by the normal map 202 and the corresponding height map 204. For example, the height map generation system 102 determines material parameters based on information within the height map 204 such as the heights of pixels.

Additionally (or alternatively), the height map generation system 102 performs an act 324 to generate a three-dimensional rendering. In particular, the height map generation system 102 generates a rendering of a three-dimensional digital model that is represented by the height map 204 and the normal map 202. Indeed, the height map generation system 102 generates and displays the rendering of the three-dimensional digital model within a user interface of the client application 110 for an artist to provide input to manipulate or edit the three-dimensional digital model.

Figure 4:
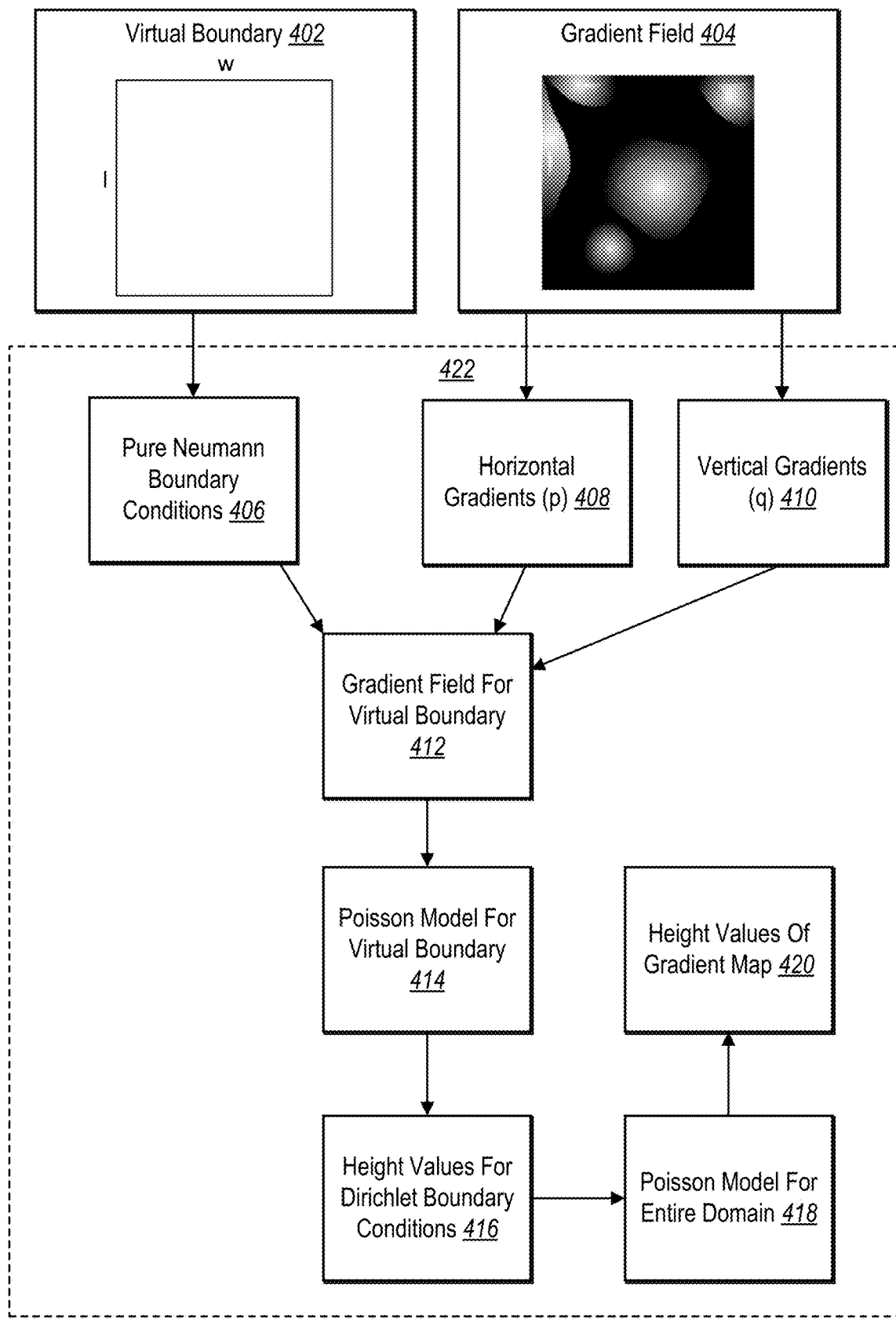
FIG. 4 illustrates an example flow for generating height values based on determining Dirichlet boundary conditions in accordance with one or more embodiments.

As mentioned, the height map generation system 102 determines height values for generating a height map (e.g., the height map 204). Indeed, FIG. 4 illustrates an example flow depicting how the height map generation system 102 utilizes a virtual boundary 402 and a gradient map 404 to determine height values 416 (or Dirichlet boundary conditions 416) for generating the height map 204. In addition, in some embodiments, the height map generation system 102 performs a step for generating a height map using Dirichlet boundary conditions determined from Neumann boundary conditions for a virtual boundary of the digital model, as illustrated by the dotted box 422 and the corresponding description of the components therein that is provided below.

As illustrated in FIG. 4, the height map generation system 102 identifies or generates a virtual boundary 402 and a gradient map 404. For example, the height map generation system 102 generates the gradient map 404 from the normal map 202, as described above. In addition, the height map generation system 102 generates the virtual boundary 402 as also described above.

To determine heights for pixels of the normal map 202, and based on a two-dimensional divergence operator, the height map generation system 102 expands the virtual boundary 402 in two directions. Indeed, the height map generation system 102 applies a discretization unit to determine gradient values from the gradient map 404 in relation to the virtual boundary 402. For example, the height map generation system 102 determines the horizontal gradients 408 and the vertical gradients 410 within the initial domain W of the virtual boundary 402, as given by:

$$\begin{pmatrix} p \\ q \end{pmatrix}$$

where p represents the horizontal gradients 408 and q represents the vertical gradients 410.

Outside of the domain W for the virtual boundary 402, the gradient values are unknown without further analysis. Thus, the height map generation system 102 imposes pure Neumann boundary conditions 406 on the virtual boundary 402 to determine other gradient values for generating the gradient field 412 for the virtual boundary 402 and for obtaining Dirichlet boundary conditions 416. For instance, the height map generation system 102 imposes the pure Neumann boundary conditions 406 to obtain the Dirichlet boundary conditions 416 in accordance with:

$$\frac{\partial z}{\partial \vec{n}} = 0 \Rightarrow \nabla z \cdot \vec{n} = 0 \Rightarrow \begin{pmatrix} p \\ q \end{pmatrix} \cdot \vec{n} \triangleq 0 \Rightarrow \begin{cases} p \triangleq 0 \text{ on the virtual boundary} \\ \quad \text{for } x < 0 \text{ and } x \geq w \\ q \triangleq 0 \text{ on the virtual boundary} \\ \quad \text{for } y < 0 \text{ and } y \geq l \end{cases}$$

where $$\frac{\partial z}{\partial \vec{n}} = 0$$

indicates pure Neumann boundary conditions 406 and the height values on virtual boundary 402 indicate corresponding Dirichlet boundary conditions 416. By imposing Dirichlet boundary conditions with respect to the virtual boundary, the height map generation system 102 reformulates the problem to a determination of heights within the virtual boundary 402.

As indicated by pure Neumann boundary conditions, height remain unchanged with respect to changes in normal vectors (e.g., by fixing the derivative of the height with respect to the normal vector to be zero). Thus, for one or more pixels, the height remains unchanged with respect to changes of a corresponding normal vector. Further, the height map generation system 102 determines the Dirichlet boundary conditions 416 such that, for one or more pixels, the scalar product of the normal vector with respect to a change in height is zero.

As mentioned, the height map generation system 102 generates a gradient field 412 for the virtual boundary 402 based on the pure Neumann boundary conditions 406. In particular, the height map generation system 102 utilizes the above conditions for p and q to determine gradient values for the gradient field 412 along the segments of the virtual boundary 402. To determine gradient values of the gradient field 412, the height map generation system 102 discretizes the virtual boundary 402 by parameterizing the virtual boundary 402 in accordance with:

$i \in [0, 2w+2l+2]$ or $i \in [0, 2w+2l+3]$ and parameterizing the normal map 202 in accordance with:

$(x,y) \in [0, w-1], [0, l-1]$.

Based on this parameterization, the height map generation system 102 determines horizontal gradients 408 for a bottom segment and a top segment of the virtual boundary 402. In addition, the height map generation system 102 determines vertical gradients 410 for a right side segment and a left side segment of the virtual boundary 402.

As indicated above, the height map generation system 102 further determines that, for a given pixel of the gradient map 404, the scalar product of the normal vector with respect to corresponding horizontal gradients 408 and vertical gradients 410 values is approximately zero. Thus, the height map generation system 102 determines that the horizontal gradients 408 and/or the vertical gradients 410 are approximately zero for the bottom segment and the top segment of the virtual boundary 402. Similarly, the height map generation system 102 determines that the horizontal gradients 408 and/or the vertical gradients 410 are approximately zero for the left side segment and the right side segment of the virtual boundary 402. Thus, the height map generation system 102 determines horizontal gradients 408 and vertical gradients 410 of the segments of a virtual boundary 402 based on imposing pure Neumann boundary conditions 406. In some embodiments, the height map generation system 102 determines gradient values for the gradient field 412 in accordance with:

$$\begin{cases} g(i \in [0, w-1]) = & p(i, 0) \\ g(w) = & q(w-1, 0) \\ g(i \in [w+1, w+l]) = & q(w-1, i-(w+1)) \\ g(w+l+1) = & -p(w-1, l-1) \\ g(i \in [w+l+2, 2w+l+1]) = & -p((2w+l+1)-i, l-1) \\ g(2w+l+2) = & -q(0, l-1) \\ g(i \in (2w+l+3, 2w+2l+2]) = & -q(0, (2w+2l+2)-i) \end{cases}$$

where, for example, the top line of the above equation represents the gradient values for the bottom segment of the virtual boundary 402 and the bottom line represents the gradient values for the left side segment of the virtual boundary 402.

As shown, the height map generation system 102 further utilizes a Poisson model 414 (e.g., a one-dimensional Poisson model) to evaluate a system of equations for determining the height values 416 for the virtual boundary 402—i.e., for determining the Dirichlet boundary conditions. To elaborate, the height map generation system 102 generates height values 416 via utilizing a Poisson model to evaluate a system of linear equations represented by:

$$\begin{bmatrix} 2 & -1 & 0 & 0 & 0 & \ldots & 0 \\ -1 & 2 & -1 & 0 & 0 & \ldots & 0 \\ 0 & -1 & 2 & -1 & 0 & \ldots & 0 \\ \vdots & & \ddots & \ddots & \ddots & & \vdots \\ 0 & \ldots & 0 & -1 & 2 & -1 & 0 \\ 0 & \ldots & 0 & 0 & -1 & 2 & -1 \\ 0 & \ldots & 0 & 0 & 0 & -1 & 2 \end{bmatrix} z_B =$$

$$-\frac{1}{2} \begin{bmatrix} -1 & -1 & 0 & 0 & 0 & \ldots & 0 \\ -1 & 0 & 1 & 0 & 0 & \ldots & 0 \\ 0 & -1 & 0 & 1 & 0 & \ldots & 0 \\ \vdots & & \ddots & \ddots & \ddots & & \vdots \\ 0 & \ldots & 0 & -1 & 0 & 1 & 0 \\ 0 & \ldots & 0 & 0 & -1 & 0 & 1 \\ 0 & \ldots & 0 & 0 & 0 & 1 & 1 \end{bmatrix} g_B$$

where $z_B$ represents height values 416 for the virtual boundary 402, $g_B$ represents gradient values of the gradient field 412 for the virtual boundary 402, the left-side matrix represents a Laplacian of the height, and the right-side matrix represents a divergence of the gradients. Thus, the height map generation system 102 determines the height values 416 for the virtual boundary 402 via this one-dimensional Poisson model 414.

Based on the height values 416 of the virtual boundary 402, the height map generation system 102 further determines height values for the remainder of the gradient map 404. Indeed, the height map generation system 102 utilizes the height values 416 as the boundary conditions (e.g., the Dirichlet boundary conditions) for determining the heights values 420 of the domain of the gradient map 404. For instance, the height map generation system 102 utilizes a two-dimensional Poisson model 418 for the entire domain, as described above:

$$\nabla^2 z = \nabla \cdot \begin{pmatrix} p \\ q \end{pmatrix}$$

where $\nabla$ represents the divergence of the gradient field, $\nabla^2$ represents the (two-dimensional) Laplacian of the height of a two-dimensional gradient (e.g., the gradient map 404), and where:

$$\nabla^T = \left(\frac{\partial}{\partial x}, \frac{\partial}{\partial y}\right) \text{ and } \nabla^2 = \frac{\partial^2}{\partial x^2} + \frac{\partial^2}{\partial y^2}.$$

By utilizing the two-dimensional Poisson model 418 based on the Dirichlet boundary conditions 416, the height map generation system 102 determines height values 420 for the entire gradient map 404. In addition, the height map generation system 102 generates a height map (e.g., the height map 204) based on the determined height values 420 to indicate heights of pixels of the gradient map 404 corresponding to pixels of the normal map 202.

Figure 5:
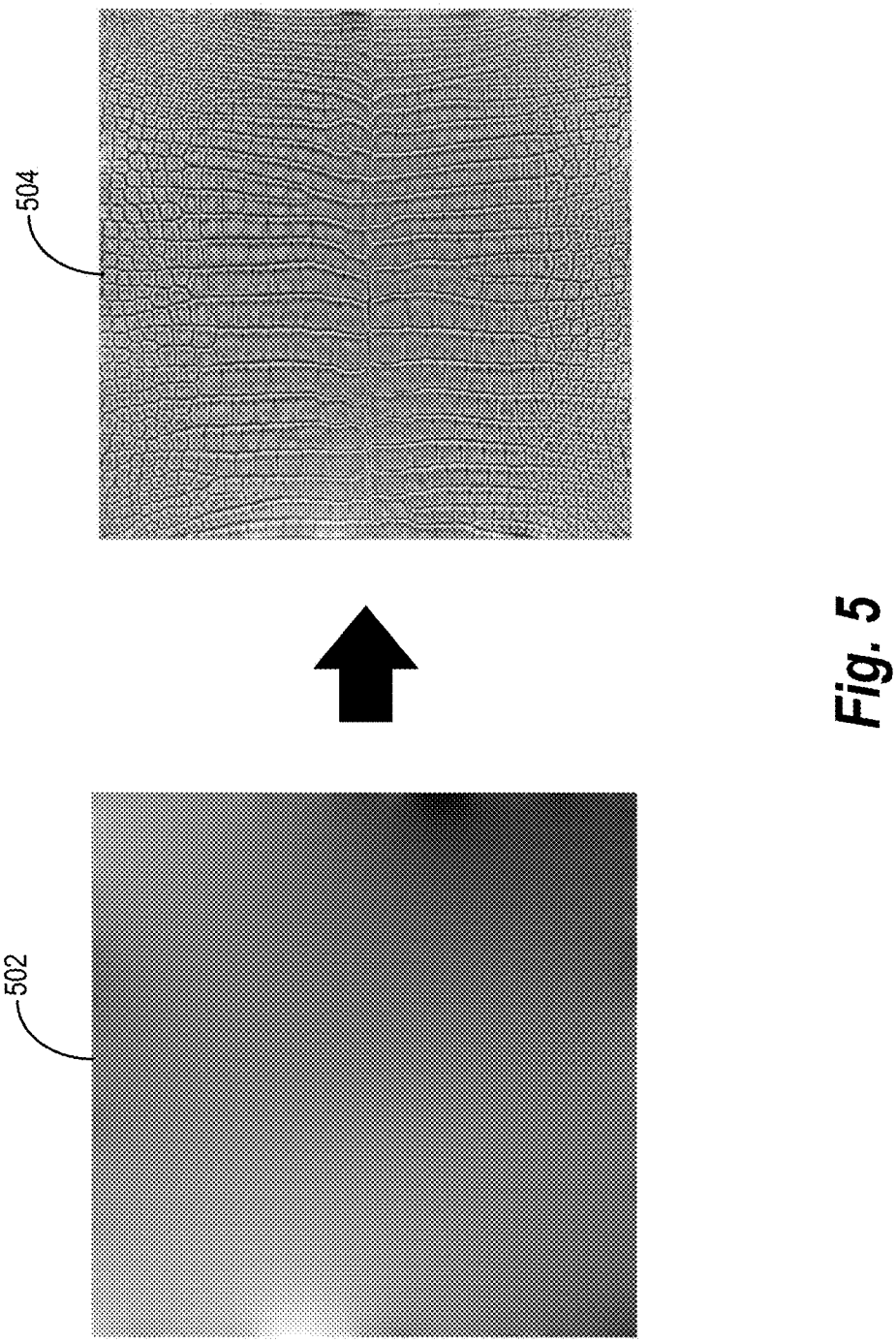
FIG. 5 illustrates an example comparison of generating a height map based on Dirichlet boundary conditions versus generating a height map based solely on Neumann boundary conditions in accordance with one or more embodiments.

As mentioned, the height map generation system 102 can generate a height map from a normal map by utilizing Dirichlet boundary conditions. FIG. 5 illustrates an example improvement of the height map generation system 102 in generating the height map 504 from a normal map based on Dirichlet boundary conditions in accordance with one or more embodiments. Indeed, the height map 502 illustrates a result of determining height values of a normal map based only on Neumann boundary conditions. As shown, the height map 502 includes little definition and oscillations within the heights. Thus, generating the height map 502 based only on Neumann boundary conditions yields results that do not accurately depict the heights of a three-dimensional digital model.

By contrast, the height map generation system 102 generates the height map 504 based on Dirichlet boundary conditions to reduce (or eliminate) the oscillations seen in the height map 502. Indeed, the oscillations at the edges are greatly attenuated in the height map 504 as compared to the height map 502. Additionally, the crocodile leather pattern is easily visible in the height map 504 due to the analysis based on the Dirichlet boundary conditions, whereas the pattern is not visible (or significantly less visible) in the height map 502.

Thus, based on utilizing Dirichlet boundary conditions to generate the height map 504, the height map generation system 102 can further determine material parameters. Indeed, by reducing oscillations and clearly identifying heights of pixels, the height map generation system 102 determines material parameters accurately as well. For example, by accurately representing the heights of pixels to determine the three-dimensional shape of a three-dimensional digital model, the height map generation system 102 determines how light interacts with the three-dimensional digital model for given pixels. Thus, the height map generation system 102 determines material parameters such as a texture of the material of the represented three-dimensional digital model, an albedo of the material, an absorbance of the material, and/or other material parameters.

Figure 6:
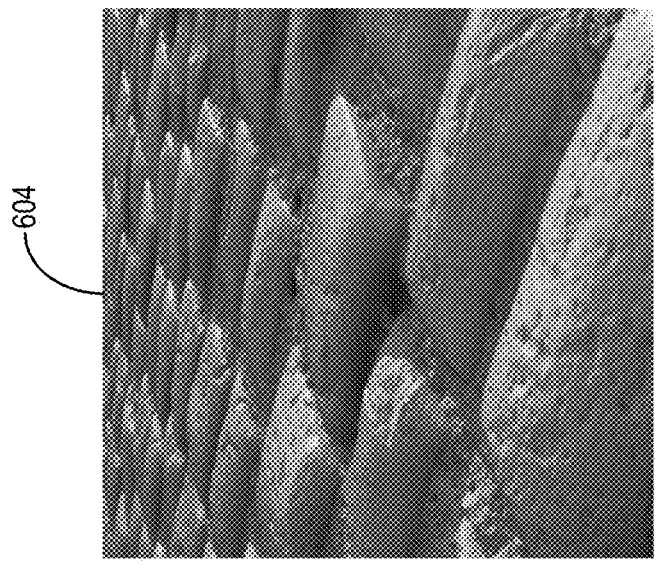
FIG. 6 illustrates an example comparison of generating a rendering of a three-dimensional digital model based on a height map versus generating a rending of a three-dimensional digital model without a height map in accordance with one or more embodiments.
Figure 6:
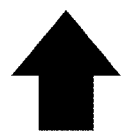
Figure 6:
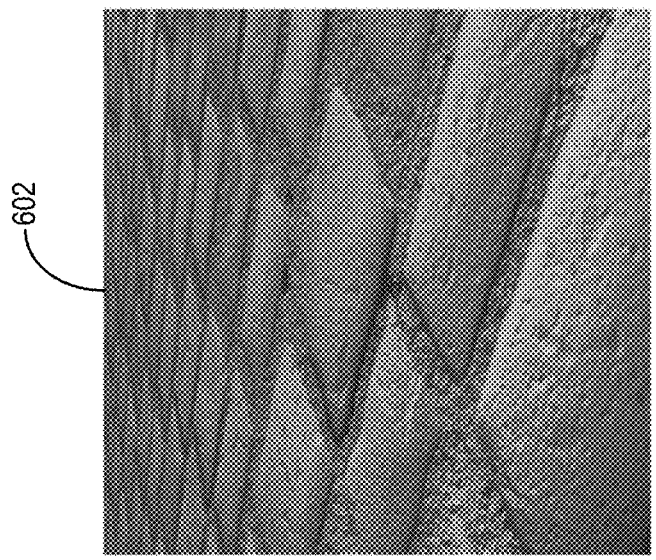

As mentioned, the height map generation system 102 can generate accurate three-dimensional renderings of three-dimensional digital models based on height maps. Indeed, FIG. 6 illustrates an example contrast between generating a first rendering 602 of a cobblestone street without utilizing a height map and generating a second rendering 604 of the same cobblestone street based on a height map.

As shown, the height map generation system 102 generates the rendering 604 by utilizing height maps that accurately represent the heights of pixels. Thus, the rendering 604 of the three-dimensional digital model much more clearly shows the height difference between sections of the cobblestones. As a result, the height map generation system 102 generates a more accurate, more realistic rendering 604 of the three-dimensional digital model of the cobblestones as compared to the rendering 602.

Figure 7:
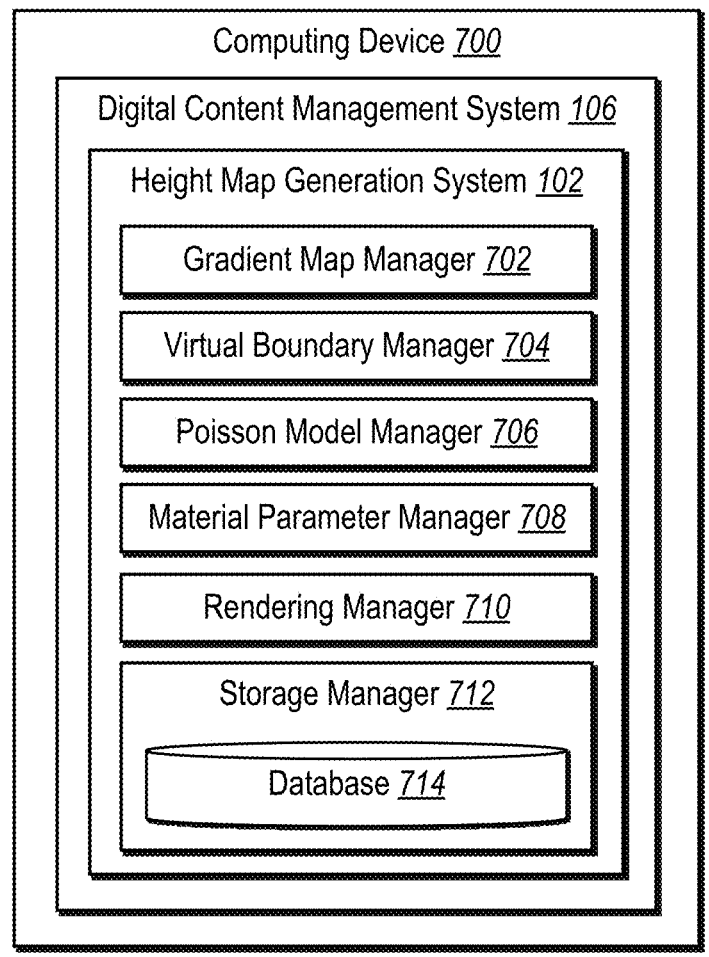
FIG. 7 illustrates a schematic diagram of a height map generation system in accordance with one or more embodiments.

Looking now to FIG. 7, additional detail will be provided regarding components and capabilities of the height map generation system 102. Specifically, FIG. 7 illustrates an example schematic diagram of the height map generation system 102 on an example computing device 700 (e.g., one or more of the client device 108 and/or the server(s) 104). As shown in FIG. 7, the height map generation system 102 may include a gradient map manager 702, a virtual boundary manager 704, a Poisson model manager 706, a material parameter manager 708, a rendering manager 710, and a storage manager 712.

As just mentioned, the height map generation system 102 includes a gradient map manager 702. In particular, the gradient map manager 702 manages, determines, generates, identifies, or obtains a gradient map based on a normal map. For instance, the gradient map manager 702 analyzes a normal map to generate a gradient map and further communicates with the virtual boundary manager 704 to determine gradient values for a gradient field of a virtual boundary. In some embodiments, the gradient map manager 702 also communicates with the storage manager 712 to store gradient maps and/or gradient values within the database 714.

In addition, the height map generation system 102 includes a virtual boundary manager 704. In particular, the virtual boundary manager 704 manages, maintains, generates, or determines a virtual boundary for a gradient map and/or for a normal map. For example, the virtual boundary manager 704 generates a one-dimensional closed curve for a virtual boundary, as described above. In addition, the virtual boundary manager 704 determines gradient values for the virtual boundary and further determines Dirichlet boundary conditions (based on Neumann boundary conditions) in the form of height values for the virtual boundary condition by communicating with the Poisson model manager 706.

Indeed, the height map generation system 102 further includes a Poisson model manager 706 that manages, maintains, utilizes, implements, or applies a Poisson model to evaluate, analyze, or solve a system of equations. For example, the Poisson model manager 706 can manage a one-dimensional Poisson model to determine height values for a virtual boundary to use as Dirichlet boundary conditions. Based on the Dirichlet boundary conditions, the Poisson model manager 706 can also manage a two-dimensional Poisson model to determine height values for a gradient map based on the height values/Dirichlet boundary conditions of the virtual boundary. The Poisson model manager 706 can also generate a height map based on the determined height values of the gradient map.

As shown, the height map generation system 102 also includes a material parameter manager 708. In particular, the material parameter manager 708 manages, determines, identifies, extrapolates, or obtains material parameters for a three-dimensional digital model represented by a height map. For example, the material parameter manager 708 determines material parameters for a material of a three-dimensional digital model based on height values of pixels within a height map.

The height map generation system 102 further includes a rendering manager 710. In particular, the rendering manager 710 manages, generates, renders, or creates a rendering of a three-dimensional digital model based on a height map. Indeed, the rendering manager 710 communicates with the Poisson model manager 706 to obtain a height map for generating a rendering of a three-dimensional digital model.

Further, the height map generation system 102 includes a storage manager 712. In some embodiments, the storage manager 712 may include, manage, or communicate with a storage device or a memory device such as the database 714. Indeed, the storage manager 712 may communicate with a memory device to store and provide various types of information such as normal map data, gradient map data, height values, and/or material parameters. In some embodiments, the database 714 can include a normal map corresponding to a three-dimensional digital model.

In one or more embodiments, each of the components of the height map generation system 102 are in communication with one another using any suitable communication technologies. Additionally, the components of the height map generation system 102 can be in communication with one or more other devices including one or more user devices described above. It will be recognized that although the components of the height map generation system 102 are shown to be separate in FIG. 7, any of the subcomponents may be combined into fewer components, such as into a single component, or divided into more components as may serve a particular implementation. Furthermore, although the components of FIG. 7 are described in connection with the height map generation system 102, at least some of the components for performing operations in conjunction with the height map generation system 102 described herein may be implemented on other devices within the environment.

The components of the height map generation system 102 can include software, hardware, or both. For example, the components of the height map generation system 102 can include one or more instructions stored on a computer-readable storage medium and executable by processors of one or more computing devices (e.g., the computing device 700). When executed by the one or more processors, the computer-executable instructions of the height map generation system 102 can cause the computing device 700 to perform the methods described herein. Alternatively, the components of the height map generation system 102 can comprise hardware, such as a special purpose processing device to perform a certain function or group of functions. Additionally or alternatively, the components of the height map generation system 102 can include a combination of computer-executable instructions and hardware.

Furthermore, the components of the height map generation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the height map generation system 102 may be implemented as part of a stand-alone application on a personal computing device or a mobile device. Alternatively or additionally, the components of the height map generation system 102 may be implemented in any application that allows creation and delivery of marketing content to users, including, but not limited to, applications in ADOBE CREATIVE CLOUD, such as ADOBE ILLUSTRATOR, ADOBE PHOTOSHOP, ADOBE PREMIERE, ADOBE RUSH, and ADOBE LIGHTROOM. "ADOBE," "ADOBE ILLUSTRATOR," "ADOBE PHOTOSHOP," "ADOBE PREMIERE," "ADOBE RUSH," and "ADOBE LIGHTROOM" are trademarks of Adobe Inc. in the United States and/or other countries.

FIGS. 1-7, the corresponding text, and the examples provide a number of different systems, methods, and non-transitory computer readable media for generating a height map from a normal map based on utilizing Dirichlet boundary conditions. In addition to the foregoing, embodiments can also be described in terms of flowcharts comprising acts for accomplishing a particular result. For example, FIG. 8 illustrates a flowchart of an example sequence of acts in accordance with one or more embodiments.

Figure 8:
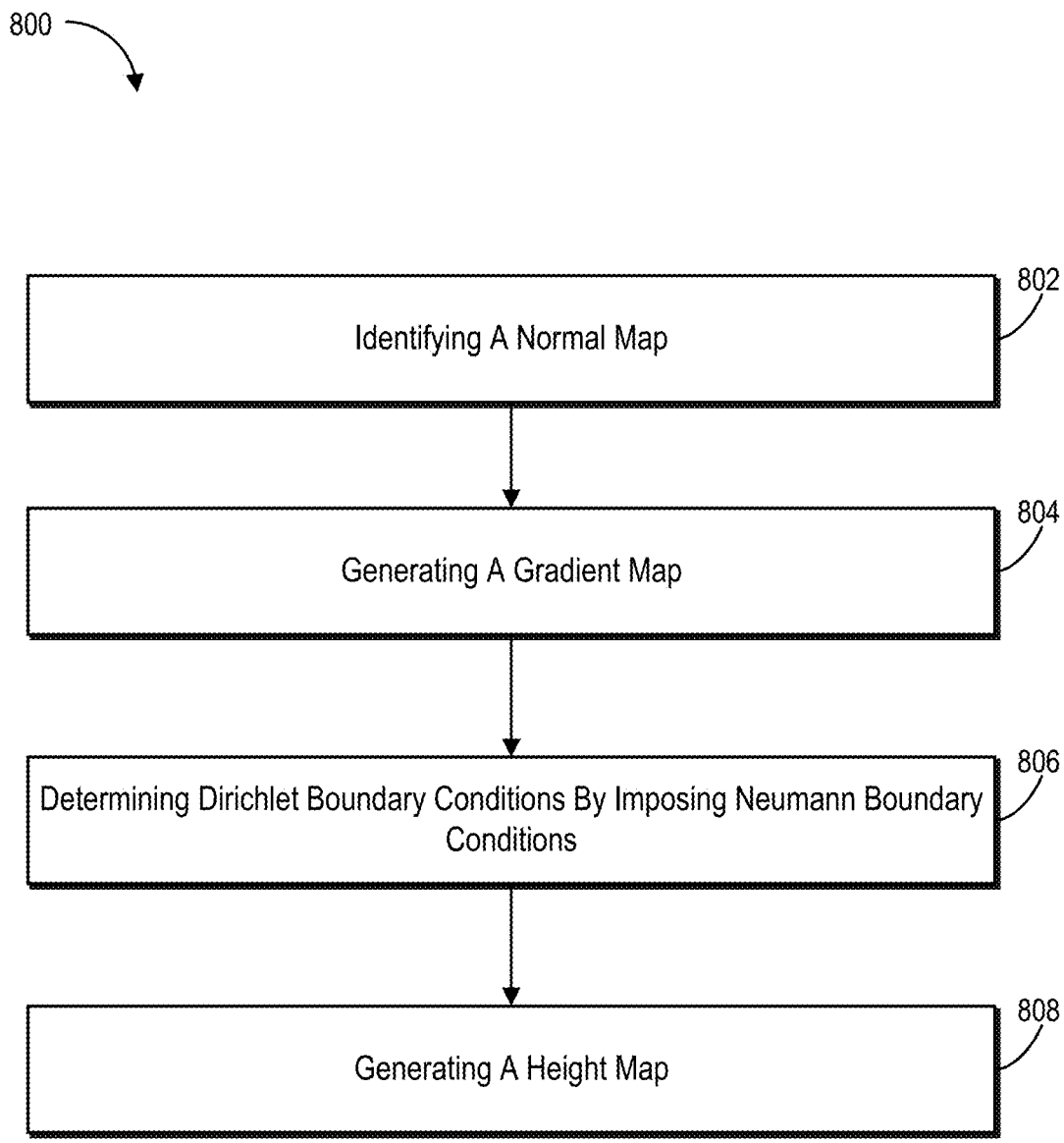
FIG. 8 illustrates a flowchart of a series of acts for generating a height map from a normal map based on determining Dirichlet boundary conditions in accordance with one or more embodiments.

While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8. Additionally, the acts described herein may be repeated or performed in parallel with one another or in parallel with different instances of the same or other similar acts.

FIG. 8 illustrates an example series of acts 800 for generating a height map from a normal map by utilizing a Poisson model based on Dirichlet boundary conditions. The series of acts 800 includes an act 802 of identifying a normal map. In particular, the act 802 can include identifying a normal map of a three-dimensional digital model.

As shown, the series of acts 800 includes an act 804 of generating a gradient map. In particular, the act 804 can include generating, based on the normal map, a gradient map of the three-dimensional digital model.

Additionally, the series of acts 800 includes an act 806 of determining Dirichlet boundary conditions by imposing Neumann boundary conditions. In particular, the act 806 can include determining, by imposing Neumann boundary conditions for a virtual boundary of the three-dimensional digital model, a Dirichlet boundary condition vector based on the gradient map of the three-dimensional digital model. The virtual boundary can be a one-dimensional periodic closed curve. The act 806 can include applying a system of linear equations utilizing the Neumann boundary conditions for the virtual boundary. In some embodiments, the act 806 can involve determining a horizontal gradient and a vertical gradient of the gradient map, defining a lower segment of the virtual boundary based on the horizontal gradient, and defining a side segment of the virtual boundary based on the vertical gradient. In these or other embodiments, the Neumann boundary conditions include pure Neumann boundary conditions.

In the same or other embodiments, the act 806 can involve determining a horizontal gradient and a vertical gradient of the gradient map, defining a lower segment of the virtual boundary based on the horizontal gradient, and defining a side segment of the virtual boundary based on the vertical gradient.

As further shown, the series of acts 800 includes an act 808 of generating a height map. In particular, the act 808 can include generating a height map of the three-dimensional digital model based on the Dirichlet boundary condition vector. For example, the act 808 can involve utilizing a Poisson model to determine heights corresponding to pixels of the normal map based on the Dirichlet boundary condition vector. Indeed, the act 808 can involve utilizing a Poisson model to determine heights corresponding to pixels of the normal map based on the Dirichlet boundary condition vector, the lower segment of the virtual boundary, and the side segment of the virtual boundary.

The series of acts 800 can also include an act of determining, based on the height map, one or more material parameters of a material represented by the normal map of the three-dimensional digital model. In some embodiments, the series of acts 800 can also (or alternatively) include an act of generating, based on the height map, a three-dimensional rendering of the three-dimensional digital model represented by the normal map.

In addition (or in the alternative) to the acts described above, in some embodiments, the series of acts 800 can include performing a step for generating a height map using Dirichlet boundary conditions determined from Neumann boundary conditions for a virtual boundary of the digital model. For instance, the algorithms and acts described in relation to FIGS. 3 and 4 can comprise the corresponding acts for a step for generating a height map using Dirichlet boundary conditions determined from Neumann boundary conditions for a virtual boundary of the digital model.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
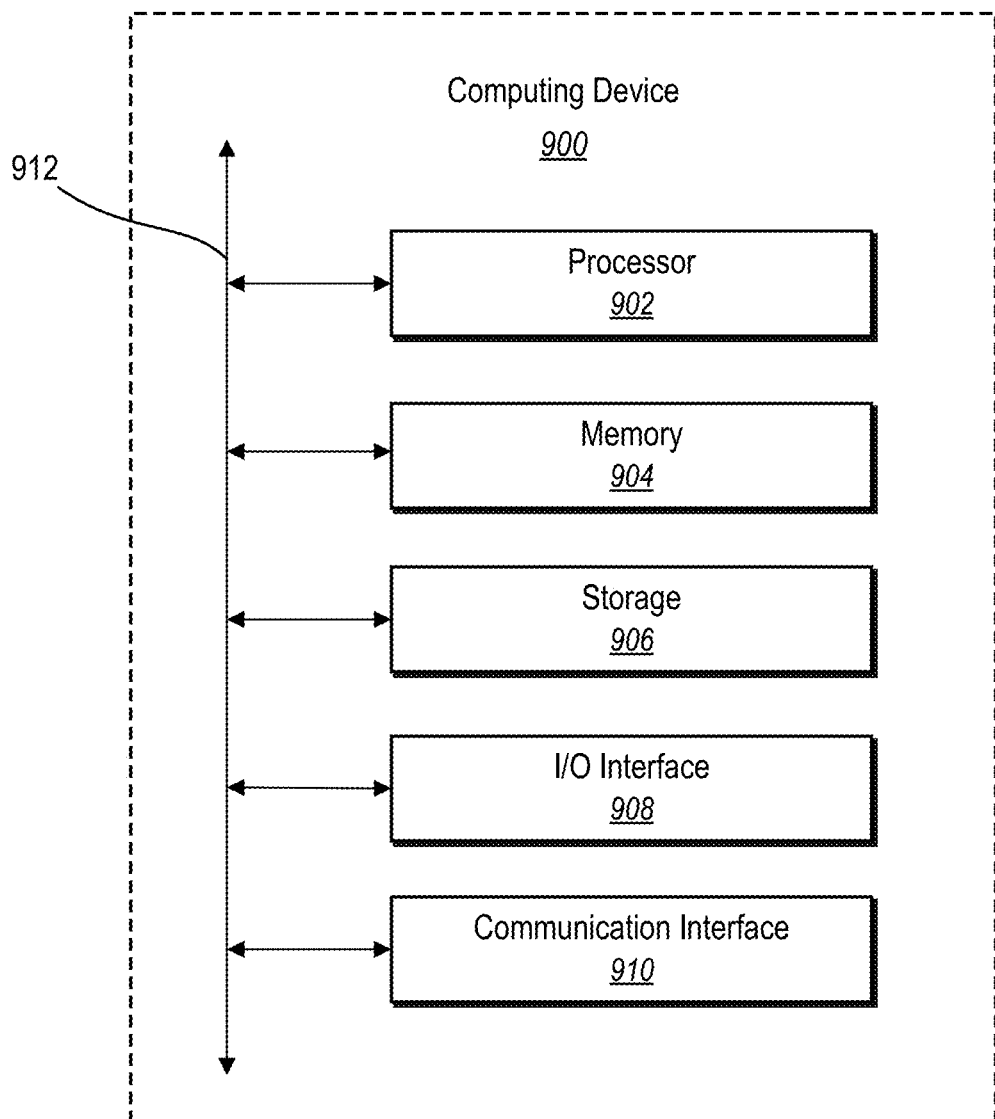
FIG. 9 illustrates a block diagram of an example computing device in accordance with one or more embodiments.

FIG. 9 illustrates, in block diagram form, an example computing device 900 (e.g., the computing device 1100, the client device 108, and/or the server(s) 104) that may be configured to perform one or more of the processes described above. One will appreciate that the height map generation system 102 can comprise implementations of the computing device 900. As shown by FIG. 9, the computing device can comprise a processor 902, memory 904, a storage device 906, an I/O interface 908, and a communication interface 910. Furthermore, the computing device 900 can include an input device such as a touchscreen, mouse, keyboard, etc. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, storage device 906 can comprise a non-transitory storage medium described above. The storage device 906 may include a hard disk drive (HDD), flash memory, a Universal Serial Bus (USB) drive or a combination of these or other storage devices.

The computing device 900 also includes one or more input or output ("I/O") devices/interfaces 908, which are provided to allow a user to provide input to (such as user strokes), receive output from, and otherwise transfer data to and from the computing device 900. These I/O devices/interfaces 908 may include a mouse, keypad or a keyboard, a touch screen, camera, optical scanner, network interface, modem, other known I/O devices or a combination of such I/O devices/interfaces 908. The touch screen may be activated with a writing device or a finger.

The I/O devices/interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computer device to:
   identify a normal map of a three-dimensional digital model;
   generate, based on the normal map, a gradient map of the three-dimensional digital model;
   determine, by imposing Neumann boundary conditions for a virtual boundary of the three-dimensional digital model, a Dirichlet boundary condition vector based on the gradient map of the three-dimensional digital model; and
   generate a height map of the three-dimensional digital model based on the Dirichlet boundary condition vector.

2. The non-transitory computer readable medium of claim 1, wherein the virtual boundary comprises a one-dimensional periodic closed curve.

3. The non-transitory computer readable medium of claim 1, further comprising instructions that, when executed by the at least one processor, cause the computer device to determine the Dirichlet boundary condition vector by applying a system of linear equations utilizing the Neumann boundary conditions for the virtual boundary.

4. The non-transitory computer readable medium of claim 3, further comprising instructions that, when executed by the at least one processor, cause the computer device to determine the Dirichlet boundary condition vector by:
   determining a horizontal gradient and a vertical gradient of the gradient map;
   defining a lower segment of the virtual boundary based on the horizontal gradient; and
   defining a side segment of the virtual boundary based on the vertical gradient.

5. The non-transitory computer readable medium of claim 1, wherein the Neumann boundary conditions comprise pure Neumann boundary conditions.

6. The non-transitory computer readable medium of claim 1, further comprising instructions that, when executed by the at least one processor, cause the computer device to determine, based on the height map, one or more material parameters of a material represented by the normal map of the three-dimensional digital model.

7. The non-transitory computer readable medium of claim 1, further comprising instructions that, when executed by the at least one processor, cause the computer device to generate, based on the height map, a three-dimensional rendering of the three-dimensional digital model represented by the normal map.

8. The non-transitory computer readable medium of claim 1, further comprising instructions that, when executed by the at least one processor, cause the computer device to generate the height map by utilizing a Poisson model to determine heights corresponding to pixels of the normal map based on the Dirichlet boundary condition vector.

9. A system comprising:
   one or more memory devices comprising a normal map corresponding to a three-dimensional digital model; and
   one or more server devices that cause the system to:
      generate, based on the normal map, a gradient map of the three-dimensional digital model;
      imposing Neumann boundary conditions to determine a Dirichlet boundary condition vector representing heights of pixels within a virtual boundary by:
         determining a horizontal gradient and a vertical gradient of the gradient map;
         defining a lower segment of the virtual boundary based on the horizontal gradient; and defining a side segment of the virtual boundary based on the vertical gradient; and generate a height map of the three-dimensional digital model based on the Dirichlet boundary condition vector.

10. The system of claim 9, wherein the virtual boundary comprises a one-dimensional periodic closed curve.

11. The system of claim 9, wherein the one or more server devices cause the system to determine the Dirichlet boundary condition vector by further applying a system of linear equations utilizing the Neumann boundary conditions for the virtual boundary.

12. The system of claim 9, wherein the Neumann boundary conditions comprise pure Neumann boundary conditions.

13. The system of claim 9, wherein the one or more server devices further cause the system to determine, based on the height map, one or more material parameters of a material represented by the normal map of the three-dimensional digital model.

14. The system of claim 9, wherein the one or more server devices further cause the system to generate, based on the height map, a three-dimensional rendering of the three-dimensional digital model represented by the normal map.

15. The system of claim 9, wherein the one or more server devices further cause the system to generate the height map by utilizing a Poisson model to determine heights corresponding to pixels of the normal map based on the Dirichlet boundary condition vector, the lower segment of the virtual boundary, and the side segment of the virtual boundary.

16. A method comprising:
identifying a normal map of a three-dimensional digital model;
generating, based on the normal map, a gradient map of the three-dimensional digital model;
a step for generating a height map using Dirichlet boundary conditions determined from Neumann boundary conditions for a virtual boundary of the three-dimensional digital model; and
generating a visual representation of the three-dimensional digital model based on the height map.

17. The method of claim 16, wherein the virtual boundary comprises a one-dimensional periodic closed curve.

18. The method of claim 16, wherein the Neumann boundary conditions comprise pure Neumann boundary conditions.

19. The method of claim 16, further comprising determining, based on the height map, one or more material parameters of a material represented by the normal map of the three-dimensional digital model.

20. The method of claim 16, further comprising generating, based on the height map, a three-dimensional rendering of the three-dimensional digital model represented by the normal map.

* * * * *